United States Patent
Flanagan (10) Patent No.: US 8,626,176 B2
(45) Date of Patent: Jan. 7, 2014

(54) METHOD AND APPARATUS FOR DERIVING FEMTO CELL TIMING INFORMATION

(75) Inventor: Michael Joseph Flanagan, Chester, NJ (US)

(73) Assignee: JDSU UK Limited (GB)

( * ) Notice: Subject to any disclaimer, the term of this patent is extended or adjusted under 35 U.S.C. 154(b) by 151 days.

(21) Appl. No.: 13/173,950

(22) Filed: Jun. 30, 2011

(65) Prior Publication Data

US 2013/0005327 A1 Jan. 3, 2013

(51) Int. Cl.
*H04W 40/00* (2009.01)
*H04W 4/00* (2009.01)
*H04J 3/06* (2006.01)

(52) U.S. Cl.
USPC ............ 455/448; 455/449; 370/338; 370/350

(58) Field of Classification Search
USPC ................... 455/422.1, 446, 448, 449, 456.1; 370/328, 338, 350
See application file for complete search history.

(56) References Cited

U.S. PATENT DOCUMENTS

| | | | |
|---|---|---|---|
| 2009/0225743 A1* | 9/2009 | Nicholls et al. | 370/350 |
| 2009/0298515 A1* | 12/2009 | Czaja et al. | 455/456.5 |
| 2010/0054237 A1* | 3/2010 | Han et al. | 370/350 |
| 2010/0189084 A1* | 7/2010 | Chen et al. | 370/338 |
| 2010/0296499 A1* | 11/2010 | Karaoguz et al. | 370/338 |
| 2011/0117932 A1* | 5/2011 | Breitbach et al. | 455/456.1 |
| 2011/0281574 A1* | 11/2011 | Patel et al. | 455/422.1 |
| 2012/0033622 A1* | 2/2012 | Kalhan | 370/329 |
| 2012/0115496 A1* | 5/2012 | Soliman et al. | 455/452.1 |
| 2012/0236977 A1* | 9/2012 | Zou et al. | 375/354 |
| 2012/0306693 A1* | 12/2012 | Edge | 342/357.29 |

FOREIGN PATENT DOCUMENTS

| | | |
|---|---|---|
| WO | 2010081658 | 7/2010 |
| WO | 2010081659 | 7/2010 |
| WO | 2010083943 | 7/2010 |

* cited by examiner

*Primary Examiner* — Christopher M Brandt
(74) *Attorney, Agent, or Firm* — Barnes & Thornburg LLP (57) ABSTRACT

A method for deriving timing information for a femto cell of a wireless communication system comprises a wireless communication unit of the system receiving observed timing data for a femto cell within a macro cell, and observed timing data for the macro cell. Timing difference values between timing offsets for the femto cell and timing offsets for the macro cell are used to determine a central reference timing difference value for the femto cell. The central reference timing difference value is set as reference timing information for the femto cell. A network element and computer program product for implementing the method of the invention are also provided.

18 Claims, 5 Drawing Sheets

METHOD AND APPARATUS FOR DERIVING FEMTO CELL TIMING INFORMATION

CROSS REFERENCE TO RELATED APPLICATIONS

This present application is related to a U.S. patent application Ser. No. 13/173,923 entitled METHOD AND APPARATUS FOR DETERMINING THE IDENTITY OF A FEMTO CELL, by Michel J. Flanagan, filed currently herewith and commonly assigned to Arieso, Ltd.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ generation of wireless communications has generally been developed to support macro-cell mobile phone communications. Such macro cells utilise high power base stations to communicate with wireless communication units within a relatively large geographical coverage area. These base stations are called 'NodeBs', in 3GPP.

Typically, mobile/portable wireless communication units, or User Equipment (UEs) as they are often referred to in 3 G, communicate with a Core Network (CN) of the 3G wireless communication system. This communication is via a Radio Network Subsystem (RNS). A wireless communication system typically comprises a plurality of Radio Network Subsystems. Each Radio Network Subsystem comprises one or more cells to which UEs may attach, and thereby connect to the network.

Lower power femto cells (or pico-cells) are a recent development within the field of wireless cellular communication systems. These lower power cells have a smaller coverage area than Node Bs. The term femto cells is used hereafter to also encompass pico-cells or similar.

Femto cells are effectively communication coverage areas supported by low power base stations, which may also be referred to as Home NodeBs (HNBs). These femto cells are intended for use within a relatively small area of the cellular network. They may support communications to UEs in a restricted, for example 'in-building', environment.

Typical applications for such femto Home NodeBs include residential and commercial, e.g. office, locations, and communication 'hotspots'. In these uses, a Home NodeB can be connected to a core network of a communication system via, for example, the Internet. A broadband connection or the like may provide this connection. In this manner, femto cells can be provided in a simple, scalable deployment. They can be used in specific in-building locations where, for example, network congestion at the macro-cell level may be problematic. Significantly, the majority of HNBs are likely to be owned and deployed by members of the public, as opposed to a Network Operator owning a Node B.

Geo-location is the identification of the real-world geographical location of, say, a UE or the like. Geo-location of UEs can be performed in several ways. These include providing a UE with positioning equipment, such as GPS, or using network and mobile measurement data for nearby cells. A macro cell typically comprises a substantially unique Primary Scrambling Code (PSC) within its location area. A macro cell may therefore be distinguished from other macro cells, and thereby identified, based on its Location Area Code (LAC) and PSC. Accordingly, by identifying nearby macro cells for a UE, an approximate location of the UE may be determined, based on mobile measurement data for the identified macro cells. However, because of the relatively large coverage area of macro cells, this approach only provides some improvement in the degree of accuracy in identifying the location of the UE.

The use of femto cells for geo-location constitutes a special case. This is because femto cells have very limited range, unlike macro cells, and there can be many femto cells within the physical footprint of a single macro cell. Thus femto cells offer the potential for a higher degree of accuracy in identifying the locations of UEs. However, attempts to use femto cells for geo-location of a UE have tended to experience difficulties, for example:

(i) Femto cells are difficult to distinguish from one another in practice. This difficulty arises since they typically either share a single common Primary Scrambling Code (PSC), or a small number of shared PSCs. This can lead to considerable ambiguity in differentiating one femto cell from another.

(ii) The relatively small number of femto cells has meant that a UE is typically only in contact with a femto cell for much less time than it has a macro cell available. Hence designers have tended to favor geo-location methods that rely on macro cells, rather than femto cells.

BRIEF SUMMARY OF THE INVENTION

Accordingly, the invention seeks to mitigate, alleviate or eliminate one or more of the abovementioned disadvantages singly or in any combination.

A method of deriving reference timing information for a femto cell of a cellular wireless communication system in accordance with the invention may comprise at least one wireless communication unit receiving observed timing data for a femto cell within a macro cell, and observed timing data for the macro cell. Observed timing difference values are then determined, based at least partly on the observed timing data. The observed timing difference values are arranged into at least one set of observed timing difference values, for the femto cell. A central reference timing difference value can be determined for each set of observed timing difference values, and thereby for the femto cell. Reference timing information can then be set for the femto cell, in accordance with the determined central reference timing difference value or values.

The method of the invention may further comprise deriving an observed timing difference value dTm, which is the difference between:

(i) an observed timing offset value for the overlying macro cell (Tm_macro); and (ii) an observed timing offset value for the femto cell (Tm_femto).

The method of the invention may further comprise arranging the observed timing difference values into the at least one set of observed timing difference values for the femto cell, on the basis of one or more of:

(i) A degree of correspondence of the observed timing difference values to previous observed timing difference values for the femto cell.

(ii) Geographical location information corresponding to the observed timing difference values. This geographical location information may be provided by the wireless communication device, or may already be known to the communication system.

(iii) Proximities of the observed timing difference values to current reference timing information for each of at least one previously mapped femto cell.

The method of the invention may comprise periodically using newly derived reference timing information for the femto cell, to replace currently held reference timing information for the femto cell. This allows the updating of the reference timing information.

A network element within a cellular wireless communication network may carry out a method in accordance with the invention. Alternatively, the method may be implemented in a mobile communication unit of the cellular communication system. The cellular wireless communication network comprises a plurality of macro cells and at least one femto cell associated with a macro cell. The network element may comprise at least one signal processing module arranged to receive observed timing data for a femto cell within a macro cell, and receive observed timing data for the macro cell, from at least one wireless communication unit. The network element may then determine observed timing difference values, based at least partly on the observed timing data, and arrange the observed timing difference values into at least one set of observed timing difference values for the femto cell, in accordance with geographical location information corresponding to the observed timing difference values. A central tendency timing difference value may be determined for each set of observed timing difference values, and the network element may then set reference timing information for the femto cell, in accordance with the determined central tendency timing difference value(s).

The signal processing module of the network element may be arranged to receive geographical location information for one or more femto cells associated with the macro cell, and arrange the observed timing difference values into the at least one set of observed timing difference values for the femto cell, by assigning the observed timing difference values to the femto cell whose currently held reference timing information corresponds most closely to the observed timing difference values.

The invention may also comprise a method for updating currently held reference timing information for a femto cell of a wireless communication system. The method of updating may comprise a wireless communication unit observing timing offset data for a femto cell, and timing offset data for a macro cell. A difference in timing offsets between the timing offset data for the femto cell and the timing offset data for the macro cell can be determined, and a reference timing difference value can be derived from the difference in timing offsets. The method of updating then comprises setting the derived reference timing difference value as new reference timing information for the femto cell.

The method of updating may further comprise a plurality of wireless communication units observing timing offset data for a plurality of femto cells, deriving a single reference timing value for each femto cell for which timing offset data for the femto cell and timing offset data of a macrocell have been observed, and updating the currently held reference timing information for each femto cell, by setting each single reference timing value as new reference timing information for the corresponding femto cell. The single reference timing value for each femto cell may be derived from timing offset data that has been obtained during a pre-defined time interval.

A measurement report may be received from the wireless communication unit, the measurement report providing timing values for communications between the wireless communication unit and the femto cell, and between the wireless communication unit and more than one macro cell. The reference timing information for the femto cell can be derived from the measurement report, the derived reference timing information comprising a reference timing difference value for the femto cell and each of the more than one macro cells.

Updated reference timing information may be obtained for the femto cell during each of a plurality of time intervals, and the reference timing information can be used to calculate a rate of drift over time of the difference in timing offsets for the femto cell and one or more macro cells. The rate of drift can be:

(i) Used to identify a failing femto cell;

(ii) Used to extrapolate a known value of difference in timing offsets for the femto cell, to thereby derive a predicted value of difference in timing offsets.

(iii) Provided to the femto cell. The femto cell may then use the information about the rate of drift to stabilise timing reference circuitry within the femto cell.

A tangible non-transitory computer program product may be provided, having stored executable program code for programming signal processing logic to perform a method in accordance with the invention. The tangible computer program product may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

These and other features, advantages, and objects of the present invention will be further understood and appreciated by those skilled in the art by reference to the following specification, claims, and appended drawings.

BRIEF DESCRIPTION OF THE DRAWINGS

Embodiments of the invention will be described, by way of example only, with reference to the accompanying drawings, in which.

DETAILED DESCRIPTION

Examples of the invention will be described in terms of a method and apparatus for deriving reference timing difference information for a femto cell of a cellular wireless communication system, the cellular wireless communication system comprising a plurality of macro cells and a plurality of wireless communication units. Typically, femto and macro cells are considered to be part of a 'network'. The communications 'system' may then be described as comprising the network, together with a plurality of wireless communication devices or UEs.

In the following exemplary embodiments, a femto cell of a Universal Mobile Telecommunications System (UMTS™) cellular wireless communication network is used. However, it will be appreciated by a skilled artisan that the inventive concept herein described may equally be implemented within cellular communication networks adapted in accordance with alternative wireless communication technologies and standards.

In a number of applications, a network element in accordance with examples of the invention may be adapted to perform a method for deriving reference timing difference information for a femto cell within a macro cell of a cellular wireless communication network.

The method of the invention comprises determining at least one observed timing difference. The at least one observed timing difference is for communications between a wireless communication device and each of:

(i) a femto cell; and
(ii) the macro cell within which the femto cell is located, and possibly also other macro cells.

Figure 1:
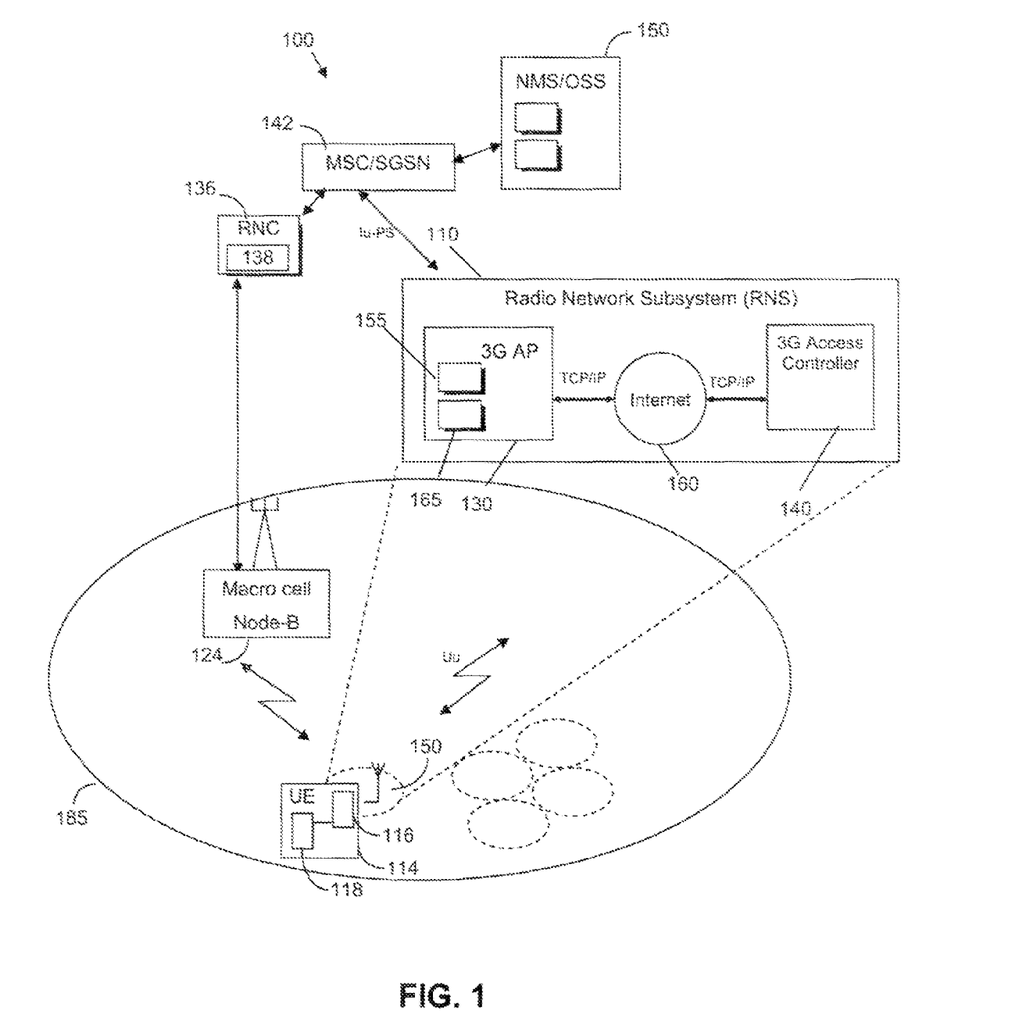
FIG. 1 is a schematic diagram, illustrating part of an exemplary cellular communication network.

One use of the derived reference timing difference information may be in a method of identifying the femto cell. Such a method is described in U.S. application Ser. No. 13/173,923, entitled Method and Apparatus for Determining The Identity of a Femto cell, by Michael J. Flanagan, commonly assigned to Arieso Limited, that is filed currently herewith and incorporated by reference in its entirety. Referring now to the drawings, and in particular to FIG. 1, an example of part of a cellular communication system 100, is illustrated.

The network of the cellular communication system 100 is adapted in accordance with an example embodiment of the invention. The example illustrated in FIG. 1 is a communication system in a form of a third generation partnership project (3GPP™) UMTS™ network. Network 100 comprises a combination of a macro cell 185 and a plurality of 3G femto cells 150, in accordance with one embodiment of the invention. For the example embodiment illustrated in FIG. 1, the radio network sub-system (RNS) comprises two distinct architectures, to handle the respective macro cell and femto cell communications.

In the macro cell scenario, the RNS comprises a controller in the form of a Radio Network Controller (RNC) 136. RNC 136 has, inter alia, signal processing logic 138. The RNC 136 is operably coupled to a macro NodeB 124 for supporting communications within the macro cell 185. The RNC 136 is further operably coupled to a core network element 142, such as a serving general packet radio system (GPRS) support node (SGSN)/mobile switching centre (MSC), as known.

In a femto cell scenario, an RNS 110 comprises a network element, which for the illustrated example embodiment is in a form of a 3G Home NodeB (HNB) 130. The HNB 130 is arranged to perform a number of functions generally associated with a base station. The RNS 110 further comprises a controller in the form of a 3G Access controller 140. As will be appreciated by a skilled artisan, a Home NodeB (HNB), also referred to as a femto access point, is a communication element that supports communications within a communication cell, such as a 3G femto cell 150. So the HNB 130 provides access to a cellular communication network via the 3G femto cell 150. An HNB 130 may be purchased by a member of the public and installed in their home. The HNB 130 may then be connected to a 3G Access Controller 140 over the owner's broadband internet connection 160.

Thus, a 3G HNB 130 may be considered as encompassing a scalable, multi-channel, two-way communication device. The 3G HNB 130 may be provided within, say, residential and commercial (e.g. office) locations, 'hotspots' etc, to extend or improve upon network coverage within those locations.

There are no standard, defined criteria for the functional components of a 3G HNB. However, an example of a typical HNB for use within a 3GPP system may comprise some traditional macro NodeB functionality, and some aspects of the radio network controller (RNC) 136 functionality. For the illustrated embodiment, the HNB 130 comprises transceiver circuitry 155 arranged to enable communication with one or more wireless communication units. Those wireless communication units must be located within the general vicinity of the communication cell 150, and in particular within the communication cell 150. An example of such a wireless communication unit would be User Equipment (UE) 114, connected via a wireless interface (Uu).

The 3G Access Controller 140 may be coupled to the core network element 142 via an Iu interface, as shown. In this manner, the HNB 130 is able to provide voice and data services to a cellular handset, such as UE 114, in a femto cell. These services are provided in the same way as a conventional macro NodeB, but with the deployment simplicity of, for example, a Wireless Local Area Network (WLAN) access point.

For the illustrated example of FIG. 1, the cellular communication network further comprises one or more network management systems (NMS) and/or operational support systems (OSS). These are illustrated generally at 150. Such systems may typically support, for example, processes such as maintaining network inventory, provisioning services, configuring network components, managing faults, etc.

Figure 2:
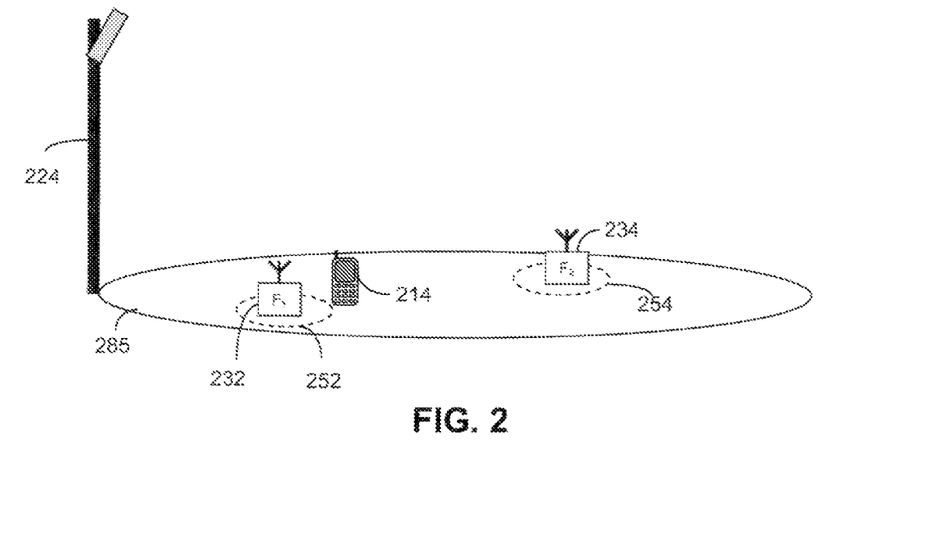
FIG. 2 is a schematic diagram, illustrating the location of two femto cells and a wireless communication unit within a footprint of an overlying macro cell.

FIG. 2 illustrates the limited range of femto cells. Due to their limited range, femto cells typically reside within the larger footprint of at least one macro cell. FIG. 2 illustrates schematically:

(i) The distance between a wireless communication device 214 and the NodeB 224 that supports the macro cell 285; and
(ii) The distance between the wireless communication device 214 and HNBs 232 and 234. HNB 232 supports a first femto cell 252 within the footprint of the macro cell 285. HNB 234 supports a second femto cell 254, which is also within the footprint of the macro cell 285.

These distances vary, depending on the particular location of the wireless communication device 214 within the footprint of the macro cell 285.

Due to the limited range of femto cells 252 and 254, the wireless communication device 214 must be in close proximity to one of the HNBs 232 or 234 in order for the wireless communication device 214 to be able to observe a femto cell 252 or 254. Here 'close proximity' may be typically within, 50 meters. Accordingly, if a femto cell 252 or 254 observed by a UE 214 can be identified, the geographical location of the UE 214 may be determined to be approximately that of the HNB 232 or 234 supporting that femto cell.

However, a large number of femto cells have already been deployed in real world networks. An even greater number are anticipated to be deployed in the future. As specified above, conventional methods for identifying macros cells do not apply to femto cells. In particular, Primary Scrambling Codes (PSCs), which conventionally enable macro cells to be identified, are typically shared by many femto cells within a location area. Thus a PSC cannot be used to differentiate between different femto cells.

The inventors of the present invention have realised that timing offset data for femto and macro cells observed by a wireless communication device/UE may be used to derive and/or update reference timing information, for femto cells within the footprint of a macro cell. That reference timing information may be used for a variety of purposes.

In particular, the inventors have realised that observed timing differences between an observed macro cell timing offset, and an observed femto cell timing offset, can be used. By updating reference timing difference information for a femto cell within a macro cell of a cellular wireless communication network, the reference information can be kept accurate. Such information may be fed into and used in other methods, for example in identifying a femto cell as described in the commonly owned patent application as referenced herein. So, in the commonly assigned patent application as identified herein. The reference timing difference information may serve other uses. For example, it may indicate faults in the wireless communication network or a macro cell.

In general terms, the observed timing differences provide a means by which a femto cell may be distinguished from one or more other femto cells within the same macro cell footprint. This approach may thus enable femto cells within a macro cell footprint to be identified. The reference timing difference information may also, for example, indicate faults in the wireless communication network or a macro cell.

Figure 3:
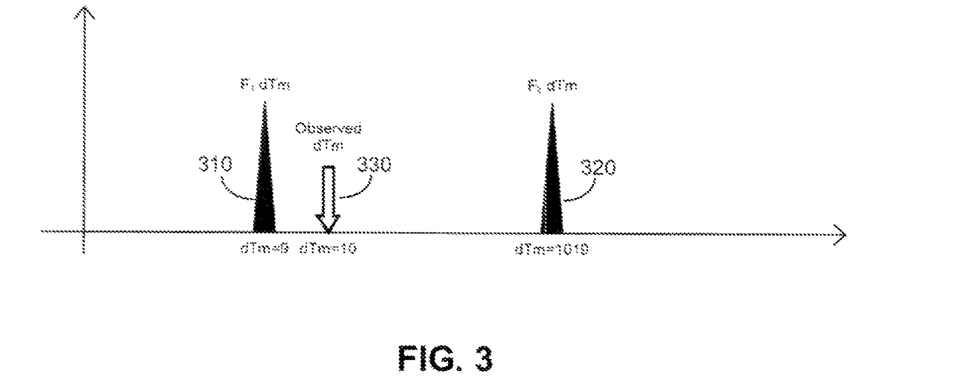
FIG. 3 is a schematic diagram, illustrating a simplified example of observed and reference timing differences for the cells of FIG. 2.

FIG. 3 illustrates an example of observed timing difference data. The location of femto cells F1 and F2 from FIG. 2 are shown in FIG. 3 at 310 and 320. The location of UE 214 of FIG. 2 is shown at 330 in FIG. 3. Typically, UEs within cellular communication networks, such as a UMTS network, provide measurement reports to the network. Such reports comprise measured data for observed cells, including both femto and macro cells. The data typically comprises signal strength measurements and timing offset values for the observed cells. These timing offset values provide an indication of a signal delay between the UE and the femto cells and macro cells. Accordingly, when the UE 214 illustrated in FIG. 2 comes into range of femto cell 252 for example, it provides a measurement report. That measurement report will comprise measurement data, including timing offset data for:

(i) femto cell 252; and
(ii) macro cell 285, within which femto cell 252 is located.

In this example, macro cell 285 may be referred to as the 'overlying macro cell'. In FIG. 2, both first femto cell 252 and second femto cell 254 lie wholly within macro cell 285. However, a femto cell may lie at the outer periphery of the coverage area of macro cell 285. For such a femto cell, some part of the coverage area of the femto cell may lie outside the coverage area of macro cell 285. In such a case, only a part of the femto cell can be described as lying within macro cell 285. This is more likely for femto cells of comparatively greater size, and some femto cells may cover an area of up to a few hundred meters or more. A UE 214 will only be able to provide a measurement report to the network with timing offset data for both the femto cell and the macro cell, when it is within the part of the femto cell from which it can also see HNB 224 of the macro cell.

In accordance with the invention, an observed timing difference may be determined, upon receipt of a measurement report comprising measurement data for first femto cell 252 or second femto cell 254, and overlying macro cell 285. The timing difference is based at least partly on the observed timing offset data for the femto cell 252 or 254, and the overlying macro cell 285. For example, the observed timing data provided within the measurement report may comprise an observed timing offset value for each of one or more observed macro cells, and in particular for the observed femto cell 252 or 254 and the overlying macro cell 285.

An observed timing difference value may be determined for the observed femto cell 252 or 254 and the overlying macro cell 285 by subtracting one of the timing offset values therefor from the other. For example, an observed timing difference value may be calculated by subtracting, say, the observed timing offset value for the overlying macro cell 285 from the observed timing offset value for the observed femto cell 252 or 254.

If the following notation is used:
'dTm' for the observed timing difference value
'Tm_macro' for the observed timing offset value for the overlying macro cell 285
'Tm_femto' for the observed timing offset value for the observed femto cell 252 or 254
Then the observed timing difference value ($d^{TM}$) may be expressed as:

$$dTm = Tm\_femto - Tm\_macro \qquad [\text{Eq. 1}]$$

Due to the limited range of femto cells, the observed timing offset value Tm_femto for an observed femto cell 252 or 254 will typically be relatively consistent within a small window of time. This means that dTm will not vary significantly at a particular femto cell, due to the limited range of the femto cell. As noted in the commonly assigned patent application as identified herein, different femto cells will tend have different dTm values.

The exact value of Tm_macro will usually be different at femto cell 252, compared to the Tm_macro observed at femto cell 254. This is because femto cell 252 and femto cell 254 are likely to be at different distances from NodeB 224 of the macro cell. What is important is that the dTm value will almost always be different at femto cell 252 compared to femto cell 254.

The femto cells are likely to have substantial timing drift, over time, compared to macro cells, because the femto cells are consumer electronic devices. The more expensive macro cells can afford to have expensive timing references, such as ovenized oscillators and sophisticated frequency lock loops. However, the femto cells typically have less accurate timing references. The drift of the timing reference of a femto cell can be tracked over time. The timing reference can then still be used to distinguish one femto cell from another.

The inventors have thus recognised that the observed timing difference value dTm for an observed femto cell 252 or 254 and an overlying macro cell 285 is capable of providing a defining characteristic for each femto cell 252 or 254. This defining characteristic can be used as a differentiating characteristic between each of the femto cells in a macro cell, so serves as an identifier of the femto cell. See also Applicant's commonly owned application as referenced herein.

The present invention therefore provides a method of deriving reference timing difference information for a femto cell, and for updating that information over time.

The actual values of the offsets themselves, such as Tm_femto and Tm_macro, are defined by the 3GPP standards. Each offset is the time offset, between:

(i) The observed start of a 10 millisecond radio frame, transmitted by the cell in question, and as received by the wireless communication unit; and
(ii) The 10 millisecond timing reference used by the wireless communication unit.

The macro cell may, for example, provide a time stamp embedded in a communication that is sent to the wireless communication unit. The wireless communication unit will however see that time stamp as being offset from the timing reference used in the wireless communication unit, by an amount that depends on two parameters, as follows:

(i) One parameter is the amount by which the timing provided by timing circuitry in the NodeB of the macro cell differs from the timing reference used in the wireless communication unit. If, for example, the wireless communication unit has an 'absolute' time reference available, such as the correct time for the time zone in which it is located, the timing circuitry within the Node B is likely not to provide exactly this absolute time. The time stamp inserted by the NodeB in a communication to the wireless communication unit will thus differ correspondingly from the 'absolute' time reference used by the wireless communication unit.

(ii) The other parameter is the time taken for the communication to travel from the location of the NodeB 224 to the wireless communication unit 214. For a wireless communication unit within the footprint of one femto cell such as femto cell 252, the distance to the NodeB of the macrocell varies little across the footprint of the femto cell.

The measurement unit for these offsets is the 'chip'. UMTS has a chip rate of 3.84 Million chips per second. The unit of a chip is a thus a duration of 1/3.84 microseconds=260.4 nsec So the timing offset values represent the number of "chips" in a 10 msec radio frame, and hence vary between 0 and 38399. So a measurement may yield one of 38400 possible Tm values. This is 3.84e6*10 e-3=38400.

Accordingly, a corresponding observed timing difference dTm, between the timing offset of a femto cell and the timing offset of a macro cell, may also vary from 0 to 38399. It is important to note that the Tm offset values are expressed modulo 38400. This is because the addition of an integer multiple of 38400 chips, such as 38400 or 76800 chips, does not change the relative location of the 10 millisecond timing boundaries. Examples of the value that a timing difference may take are therefore 0, 1, 2, 3, . . . , 38399.

The input values of Tm on the right side of equation 1 are therefore given modulo 38400, for a UMTS system. So the output values of dTm on the left of equation 1 will also be expressed as a value between 0 and 38399. That is, this difference value of dTm is also expressed modulo 38400. In fact, an arbitrary offset can also be introduced. This could be arranged to lead, for example, to an output value that is expressed as a value between −19200 and 19199. This example would still provide a total range of 38400, and be expressed modulo 38400. However, this allows negative numbers as well as positive numbers. In this latter approach, some example dTm values include: 0, 1, −1, 2, −2, 3, −3, etc.

Considering again the example illustrated in FIGS. 2 and 3:
(i) NodeB 224 supports the overlying macro cell 285;
(ii) First femto cell F1 252 may be located relatively close to NodeB 224; and
(iii) Second femto cell F2 254 may be located further away from NodeB 224.

There will be no relationship between physical proximity and dTm values. Variability in dTm values will be driven mostly by the random timing initialization and timing drifts in the femto cell oscillators. The observed dTm value at the first femto cell 252 is a function of femto cell clock initialization and femto cell clock drift. For example, it might take a value of, say, '9 chips' at a particular point in time. This is illustrated below icon 310 in FIG. 3, as dTm=9.

The value of dTm for femto cell 254 relative to NodeB 244 will generally be quite different than that for femto cell 252 relative to NodeB 244, due to different clock initialization and subsequent clock drift. For example, it might take a value of, say, '1019 chips'. This is illustrated below icon 320 in FIG. 3, as dTm=1019.

The example illustrated in FIG. 3, shows a measurement of '10 chips' as dTm for the current location 330 of the wireless communication device. The closest reference timing difference value to the observed value is the value '9 chips', illustrated at 310 for femto cell 252 F1. Hence the observed value of '10 chips' in FIG. 3 is most likely to be a measurement of the timing difference of femto cell F1. The observed value of 10 chips may then be added to the set of all values recorded from various wireless communication devices for femto cell F1. Thus, timing reference information can be derived by a process of 'mapping' difference values for femto cells, in relation to individual overlying macros cells. This mapped timing reference information may then be used for other purposes. Importantly, it may be updated.

A wireless communication device such as UE 214 is typically within range of more than one macro cell. Accordingly, a measurement report from a single wireless communication device may comprise observed timing data for more than one macro cell. It is therefore contemplated that the method for deriving reference information may use data from one measurement report from one wireless communication device to derive reference data for timing offsets between the femto cell and more than one macro cell.

The method for deriving reference timing difference information for a femto cell may be performed substantially anywhere within the cellular communication network 100 that timing data received from a UE is made available, and where reference timing difference data for macro cells is also made available.

The method may be implemented within the NMS/OSS 150 part of the network 100, for example by way of a computer-readable code such as a software subroutine stored within a memory element 152 of the NMS/OSS 150 and executed on a signal processing module 155 thereof.

Figure 4:
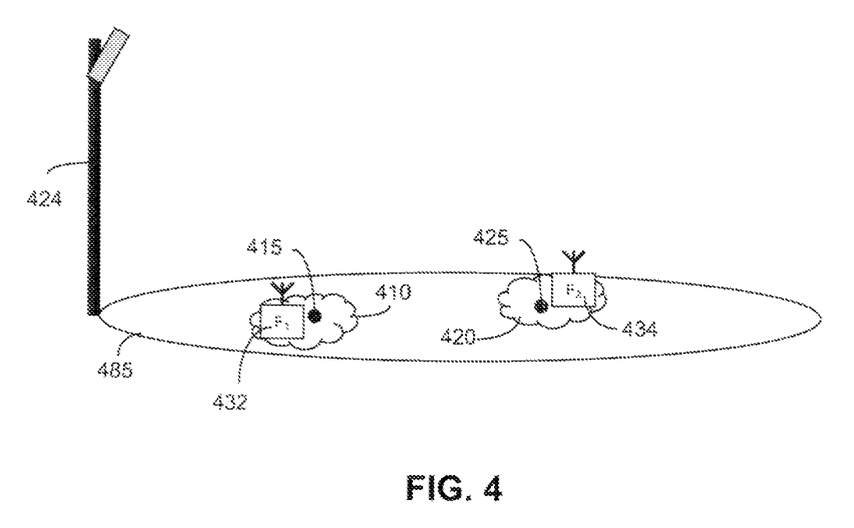
FIG. 4 is a schematic diagram, illustrating observed femto and macro timing data within a footprint of a macro cell such as that shown in FIGS. 2 and 3.

FIG. 4 illustrates schematically an example of observed femto and macro cell timing data, received from at least one UE. FIG. 4 also shows how geographical location information can be used with the measurements of femto cell and macro cell timing data, to determine observed timing difference values for femto cells within a footprint of a macro cell 485.

Firstly, timing difference values are obtained for the location of wireless communication devices in a macro cell. These values may then be arranged into one or more sets, or 'clusters', of values. This arrangement may be performed in accordance with, say, the geographical location information corresponding to the respective observed timing data. This is illustrated at 410, 420 in FIG. 4. The 'cloud' shape 410 around femto cell F1 430 represents locations from which a wireless communication device in macro cell 485 observes timing data from both macro cell 485 and femto cell 430. 'Cloud' shape 420 around femto cell F2 432 represents locations from which a wireless communication device in macro cell 485 observes timing data from both macro cell 485 and femto cell 434.

A central tendency timing difference value, for example an average or median value, may then be determined for each set of observed timing difference values. For example, if a set of observed timing difference values comprised the values: "0,1, 2,0,1,2,0,1,2,0,1,2", then a central tendency timing difference value might be, say, "1". Similarly, a central tendency geographical location value may also be determined, based on the corresponding geographical location information, which may be provided by the wireless communication unit. Note that this value may be used to map the observed timing difference value in question to a location. This mapping may occur via the average/median location, or to a particular femto cell location in a look up table, via the closest femto cell to the average/median location.

Thus, observed femto and macro cell timing data, and geographical location information received from UEs, may be used to map central tendency timing difference and geographical location values for femto cells. Such mapped data may then be stored (set) within a memory element. That mapped data serves as reference information. The reference information is available for subsequent use. One use is to enable the identification of femto cells, by another wireless communication device that moves into the footprint of one of the femto cells. The method described above may be used to provide reference timing information for one or more femto cells, when no reference timing information was previously available. However, there also may be a need to update such information.

Due to the need to produce low cost HNB devices, femto cells are likely to have timing references that drift significantly over time, relative to the NodeBs of the more stable macro network. Accordingly, the timing difference values for a femto cell and an overlay macro cell are also likely to drift over time. Mapped timing difference data for femto cells may therefore need to be updated, in order to compensate for such drift.

For example, as previously mentioned, observed timing data for femto cells and the macro cells may be received from wireless communication units, and used to determine observed timing difference values based (at least partly) on the observed timing data. Such observed timing difference values may then be compared with previously received mapped timing difference data. Such observed timing difference values may be then retained, for example stored, for subsequent use as reference timing difference information, to compensate for drift within the timing references of the femto cells.

The observed timing difference values for a macro cell obtained over a period of time may be arranged into one or more sets, or 'clusters', of values. This may be done in accordance with, say, their proximity to (current) mapped timing difference values for mapped femto cells, within the footprint of the macro cell. See once more femto cells 410, 420 in FIG. 4.

For example, assume that current mapped timing difference values for mapped femto cells comprise "0" and "1000". This numerical example shows how two different femto cells can have very different, and thus defining, dTm values. Assume also that the observed timing difference values comprise the values:

"0,1,2,0,1,2,0,1,2,0,1,2,1000,1001,1002,1000,1001,1002"
Then the observed timing difference values may be arranged into the following two sets of values:
"0,1,2,0,1,2,0,1,2,0,1,2"
"1000,1001,1002,1000,1001,1002".

A central tendency timing difference value, for example an average or centroid value, for each set of observed timing difference values may then be determined, based on the observed timing difference values. For example, for the set of observed timing difference values comprising the values: "0,1,2,0,1,2,0,1,2,0,1,2", a central tendency timing difference value might be, say, "1". Similarly, for the set of observed timing difference values comprising the values: "1000,1001,1002,1000,1001,1002", a central tendency timing difference values might be, say, "1001".

The previous reference timing difference information based on the values "0" and "1000" for the femto cells may then be updated, with these newly determined central tendency difference values. Thus, for this example, the mapped timing difference values would be updated from "0" and "1000" to "1" and "1001" respectively. The values '1' and '1001' then become the current reference timing difference information for the femto cells, until such time as newly received data allows these values, in turn, to be updated.

Table 1 below shows some exemplary observed timing difference values, and how they may be both arranged and used. The timing values shown in columns 2-5 of Table 1 are all in units of 'chips'. For a UMTS system, each chip corresponds to 260.4 nsec.

The first column of Table 1 shows the identifiers of two femto cells, such as those in FIGS. 2 and 3. In the wireless communications system, these femto cells F1 and F2 would each be known by a unique identifier. The identifier held for each femto cell may, for example, be the IP address for the HNB of the femto cell. The second column of Table 1 shows the existing reference value for each femto cell. The values '1' and '1001' have been chosen, these being the results from the example explained above. The third column of Table 1 shows at least one set of observed timing difference values. These are values obtained since the timepoint when reference values of '1' and '1001' were set as reference values. The third column may show all the sets of values observed in, for example, a time interval of 15 minutes since the last update was performed.

Femto cell F1 is shown with two sets of observed timing difference values in the third column. These may, for example, have been observed by two different wireless communication devices, which were within range of femto cell F1 within the 15 minutes period covered by table 1. The lowest row in the third column shows a set of observed timing values for a femto cell that has not previously been identified. This might be a newly installed femto cell.

The fourth column of Table 1 shows the centroid value derived for the set of observed timing difference values shown in the same row.

The fifth column of Table 1 shows the new reference value for the timing offset for the femto cell in the same row. Clearly timing drift has lead to the reference value for femto cell F1 needing to be changed from 1 chip to 4 chips. Normally such a change would be due to drift within the femto cell's timing reference circuitry.

TABLE 1

Exemplary observed timing difference values

| Femto cell identity | Existing reference value | Set(s) of observed timing difference values | Central reference value for observed set | New reference value |
|---|---|---|---|---|
| F1 | 1 | 2, 3, 3, 2, 3, 3, 3 | 3 | 4 |
|  |  | 3, 4, 3, 4, 4, 4, 4 | 4 |  |
| F2 | 1001 | 1002, 1001, 1001, 1002, 1001 | 1002 | 1002 |
| Unknown | None known | 550, 551, 551, 550, 551, 552 | 551 | 551 |

A set of timing difference values such as 3,4,3,4,4,4,4 in the second row of table 1 may in fact be obtained in one of a variety of ways. These include:

(i) All of the values 3,4,3,4,4,4,4 may have been obtained by one wireless communications device, during one call within the femto cell.

(ii) Some of the values, such as 3,4,3 at the start of the sequence may have been obtained by one wireless communications device, and the remaining values 4,4,4,4 by a different mobile.

(iii) Each of the values 3,4,3,4,4,4,4 may have been obtained by a different wireless communications device.

The two sets of observed timing difference values 2,3,3,2, 3,3,3 and 3,4,3,4,4,4,4 for femto cell F1 may also be obtained in a variety of ways, for example:

(i) A wireless communications device may have obtained the first set early in the time interval covered by table 1. The wireless communications device, or another device, may then have obtained the second set later in the time interval, by which time the femto cell's timing had drifted further.

(ii) A wireless communications device may have obtained the first set in one part of the femto cell F1, i.e. at one particular point within the geographical area of e.g. footprint 252 of the femto cell. The second set may have been obtained in a different part of the femto cell F1, i.e. at a different point within the geographical area of e.g. footprint 252 of the femto cell. If it is a large femto cell, then there may be a difference of up to 1-3 chips across the whole width of the femto cell, due to the difference in the time of travel of signals from the macro cell and femto cell.

A new table, analogous to Table 1, could be compiled for sets of observed timing difference values obtained in the next time interval, e.g. the next 15 minutes. That table would start with the values '4' for femto cell F1, and '1002' for femto cell F2, in its second column.

The values of observed timing difference in Table 1 may be obtained from a measurement report, received from a wireless communication unit. In many instances, the measurement report will provide timing values for communications between the wireless communication unit and the femto cell, and between the wireless communication unit and more than one macro cell. In this case, one wireless communication unit can provide reference information that relates to the femto cell and timing differences to more than one macro cell.

The reference timing information provided by the process summarised in table 1 can be obtaining for the femto cell during each of a plurality of time intervals. This information may then be used to calculate a rate of drift over time of the difference in timing offsets for the femto cell and one or more macro cells. This rate of drift is sometimes referred to as a 'clock slip rate'. The rate of draft may itself be used, alone or in combination with other information, to identify a femto cell. If the rate of drift takes particular values, such as being above a threshold value or being erratic, it may be used to indicate a failing femto cell.

The rate of drift may be used to extrapolate a known value of the difference in timing offsets for the femto cell. This can then provide a predicted value of difference in timing offsets. That predicted value may be of use for a future time interval in which no wireless communication unit observes or provides a report of data for the femto cell. Information about the rate of drift may be provided to the femto cell. The femto cell may use the information about the rate of drift to stabilise timing reference circuitry within the femto cell. Although table 1 shows two known femto cells and a third unknown femto cell in a macro cell, it is now commonplace for an urban macrocell to have five or even more femto cells within it.

Figure 5:
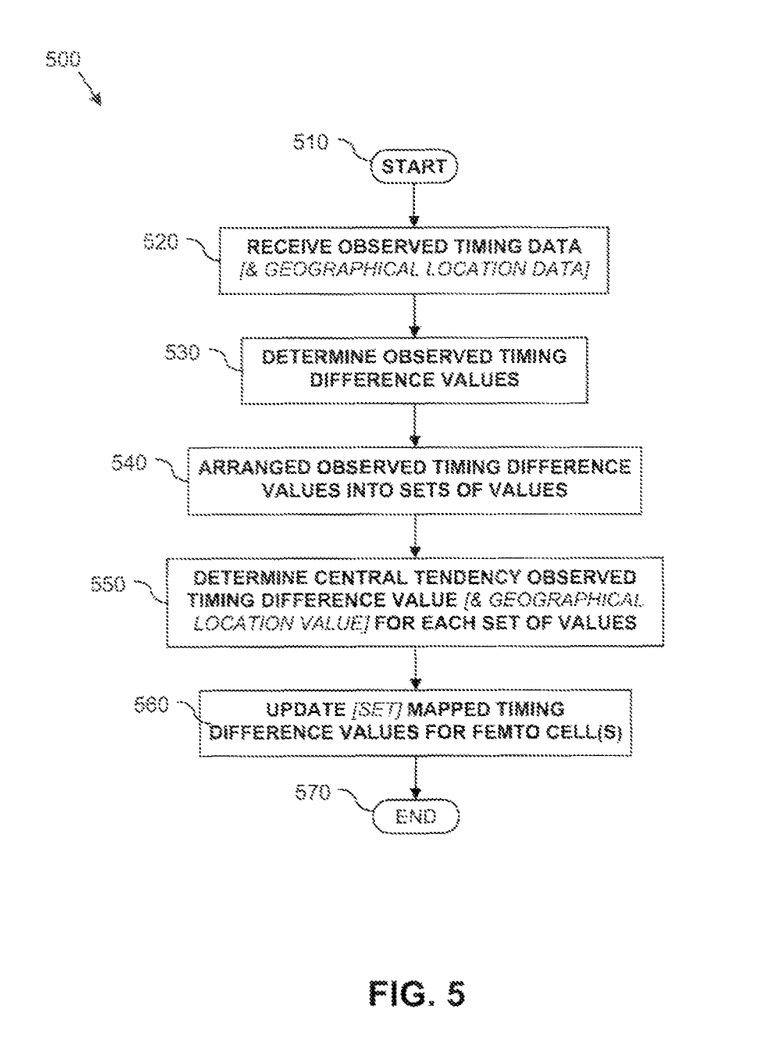
FIG. 5 illustrates a simplified flowchart of an example of a method for mapping timing difference data.

FIG. 5 illustrates a simplified flowchart 500 of an example of a method for mapping reference timing difference data for at least one femto cell within a footprint of a macro cell of a wireless communication network, in accordance with some embodiments of the present invention. Such a method may be implemented, for example, when initially mapping timing difference data and geographical location data for femto cells within the footprint of the macro cell. Additionally or alternatively, such a method may be implemented, for example, when updating reference mapped timing difference data, for femto cells within the footprint of the macro cell. This may be, for example, in order to compensate for drift of timing references for the femto cells.

The method starts at 510, and moves on to step 520 where observed timing data is received. For example such observed timing data may be received from wireless communication units over a period of time. In the case of initially mapping timing difference data and geographical location data for femto cells within the macro cell, geographical location data corresponding to the observed timing data may also be received.

Next, at 530, observed timing difference values are determined based on the received timing data. Such observed timing difference values may be determined upon receipt of the timing data over a period of time and retained, for example stored, for subsequent use in setting/updating of mapped time difference data. This determination may, for example, use equation [1] above.

The observed timing difference values are then arranged into sets of values at 540. For example, in the case of initially mapping timing difference data and geographical location data, the observed timing difference values may be arranged into sets of values in accordance with the geographical location information corresponding to the observed timing difference values. Alternatively, for example in the case of updating mapped timing difference data, the observed timing difference values may be arranged into sets of values in accordance only with (current) reference timing difference values for the previously mapped femto cell(s).

At step 550, having previous arranged the observed timing difference values into sets of values, a central tendency value, for example an average or centroid value, for each set of observed timing difference values is determined. This value is based on the observed timing difference values. In the case of initially mapping timing difference data and geographical location data, a central tendency geographical location value may also be determined, based on the corresponding geographical location information.

At step 560, mapped timing difference values for the femto cells within the footprint of the macro cell are then updated (or set), in accordance with the determined central tendency timing difference value(s). The method ends at 570.

In FIG. 5 and this description, 'mapping' has the sense of correlating together measured values with those known for each femto cell. Essentially, a dTm timing difference that a wireless communication device observes, can be assigned to a femto cell, on the basis of it differing by only a small number of chips from a timing difference value previously know to be correct for that femto cell.

The rate of drift of dTm over time may also be used as a defining characteristic of the femto cell. For example, the rate of drift may remain broadly constant, for some femto cells. For these cells, evaluating the rate of drift over time of parameter dTm can be helpful in a variety of situations. One example is when the dTm values of two different femto cells are drifting into each other from opposite directions or from the same direction. The rate of change of dTm is generally preserved in these types of "collisions" so that there is an effective way to distinguish between the two femto cells even though they had similar dTm values at a particular point in time.

Figure 6:
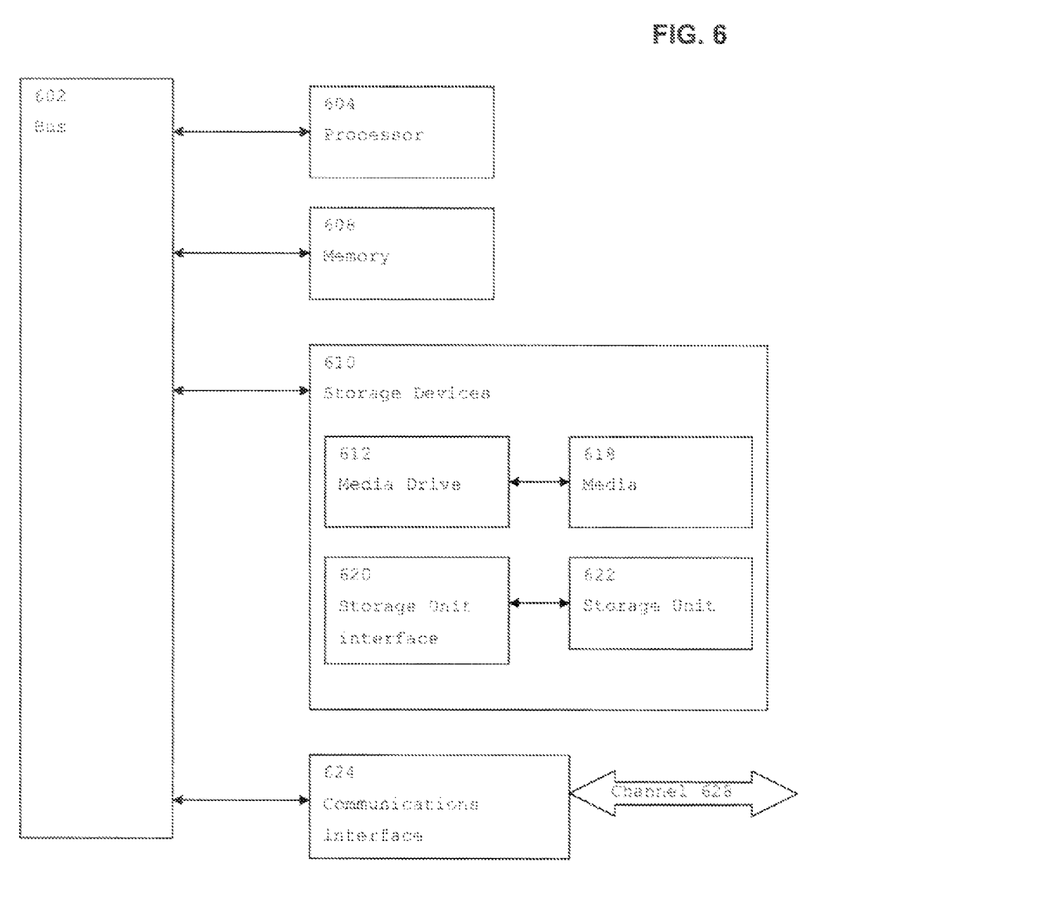
FIG. 6 is a schematic diagram, illustrating a typical computing system that may be employed to implement processing functionality in embodiments of the invention.

Referring now to FIG. 6, there is illustrated a typical computing system 600 that may be employed to implement signal processing functionality in embodiments of the invention. Computing systems of this type may be used in access points and wireless communication units. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special-purpose processing engine such as, for example, a microprocessor, microcontroller or other control module. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having particular computer software or data stored therein.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a communication channel include a phone line, a cellular phone link, an RF link, a network interface, a local or wide area network, and other communications channels.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 622, drive 612 or communications interface 624. The control module (in this example, software instructions or computer program code), when executed by the processor 604, causes the processor 604 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for deriving reference timing information for a femto cell of a cellular wireless communication system, and a corresponding method for updating currently held reference timing information for a femto cell of a cellular wireless communication system have been described, wherein the aforementioned disadvantages with prior art arrangements have been substantially alleviated.

The invention claimed is:

1. A method of deriving reference timing information for a femto cell of a cellular wireless communication system, the cellular wireless communication system comprising a plurality of macro cells and a plurality of wireless communication units, the method comprising, at a network element within the wireless cellular communication network:
receiving observed timing data for a femto cell within a macro cell, and receiving observed timing data for the macro cell, from at least one wireless communication unit;
determining observed timing difference values, based at least partly on the observed timing data;
arranging the observed timing difference values into at least one set of observed timing difference values for the femto cell, in accordance with geographical location information corresponding to the observed timing difference values;
determining a central reference timing difference value for each set of observed timing difference values, and thereby for the femto cell; and
setting reference timing information for the femto cell, in accordance with the determined central reference timing difference value for each set of observed timing difference values.

2. The method of claim 1, wherein:
an observed timing difference value dTm is the difference between an observed timing offset value for the overlying macro cell Tm_macro and an observed timing offset value for the femto cell Tm_femto.

3. The method of claim 1, comprising:
arranging the observed timing difference values into the at least one set of observed timing difference values for the femto cell, on the basis of a degree of correspondence of the observed timing difference values to previous observed timing difference values for the femto cell.

4. The method of claim 1, comprising:
arranging the observed timing difference values into the at least one set of observed timing difference values, based at least partly on proximities of the observed timing difference values to current reference timing information for each of at least one previously mapped femto cell.

5. The method of claim 1, comprising:
periodically using newly derived reference timing information for the femto cell to replace currently held reference timing information for the femto cell.

6. A network element within a wireless cellular communication network, the cellular wireless communication network comprising a plurality of macro cells and at least one femto cell associated with a macro cell, the network element comprising at least one signal processing module arranged to:
receive observed timing data for a femto cell within a macro cell, and receive observed timing data for the macro cell, from at least one wireless communication unit;
determine observed timing difference values, based at least partly on the observed timing data;
arrange the observed timing difference values into at least one set of observed timing difference values for the femto cell, in accordance with geographical location information corresponding to the observed timing difference values;
determine a central tendency timing difference value for each set of observed timing difference values; and
set reference timing information for the femto cell, in accordance with the determined central tendency timing difference value(s).

7. The signal processing module of claim 6, further arranged to:
receive geographical location information for one or more femto cells associated with the macro cell;
arrange the observed timing difference values into the at least one set of observed timing difference values for the femto cell, by assigning the observed timing difference values to the femto cell whose currently held reference timing information corresponds most closely to the observed timing difference values.

8. A method of updating currently held reference timing information for a femto cell of a wireless communication system, the wireless communication system comprising a plurality of macro cells and a plurality of wireless communication units, the method comprising, at a network element within the wireless cellular communication network:
receiving observed timing offset data for a femto cell and timing offset data for a macro cell from at least one wireless communication unit;
determining a difference in timing offsets between the timing offset data for the femto cell and the timing offset data for the macro cell;
deriving a reference timing difference value from the difference in timing offsets; and
setting the derived reference timing difference value as new reference timing information for the femto cell.

9. The method of claim 8, further comprising:
a plurality of wireless communication units observing timing offset data for a plurality of femto cells;
deriving a single reference timing value for each femto cell for which timing offset data for the femto cell and timing offset data of a macrocell have been observed;
updating the currently held reference timing information for each femto cell, by setting the single reference timing value as new reference timing information for the femto cell.

10. The method of claim 9, further comprising:
deriving the single reference timing value for each femto cell from timing offset data that has been obtained during a pre-defined time interval.

11. The method of claim 8, further comprising:
receiving a measurement report from the wireless communication unit, the measurement report providing timing values for communications between the wireless communication unit and the femto cell, and between the wireless communication unit and more than one macro cell;
deriving reference timing information for the femto cell from the measurement report, the derived reference timing information comprising a reference timing difference value for the femto cell and each of the more than one macro cell.

12. The method of claim 8, further comprising:
obtaining updated reference timing information for the femto cell during each of a plurality of time intervals; and
using the reference timing information to calculate a rate of drift over time of the difference in timing offsets for the femto cell and one or more macro cells.

13. The method of claim 12, further comprising:
using the rate of drift to identify a failing femto cell.

14. The method of claim 12, further comprising:
using the rate of drift to extrapolate a known value of difference in timing offsets for the femto cell, to thereby derive a predicted value of difference in timing offsets.

15. The method of claim 12, further comprising:
providing information to the femto cell about the rate of drift.

16. The method of claim 15, further comprising:
the femto cell using the information about the rate of drift to stabilize timing reference circuitry within the femto cell.

17. A non-transitory tangible computer program product having executable program code stored therein for programming signal processing logic to perform a method of updating currently held reference timing information for a femto cell of a wireless communication system, the wireless communication system comprising a plurality of macro cells and a plurality of wireless communication units, the method comprising, at a network element within the wireless cellular communication network:
receiving observed timing offset data for a femto cell and timing offset data for a macro cell from at least one wireless communication unit;
determining a difference in timing offsets between the timing offset data observed for the femto cell and the timing offset data observed for the macro cell;
deriving a reference timing difference value from the difference in timing offsets; and
setting the derived reference timing difference value as new reference timing information for the femto cell.

18. The non-transitory tangible computer program product of claim 17 wherein the tangible computer program product comprises at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

* * * * *